(12) United States Patent
Fujimaki

(10) Patent No.: US 7,949,571 B2
(45) Date of Patent: May 24, 2011

(54) ELECTRONIC COMMERCE SYSTEM, ELECTRONIC COMMERCE SUPPORTING DEVICE, AND ELECTRONIC COMMERCE SUPPORTING METHOD

(75) Inventor: Yusuke Fujimaki, Tokushima (JP)

(73) Assignee: Justsystems Corporation, Tokyo (JP)

( * ) Notice: Subject to any disclaimer, the term of this patent is extended or adjusted under 35 U.S.C. 154(b) by 1044 days.

(21) Appl. No.: 11/667,686

(22) PCT Filed: Nov. 14, 2005

(86) PCT No.: PCT/JP2005/020895
§ 371 (c)(1), (2), (4) Date: May 14, 2007

(87) PCT Pub. No.: WO2006/051968
PCT Pub. Date: May 18, 2006

(65) Prior Publication Data
US 2008/0015948 A1  Jan. 17, 2008

(30) Foreign Application Priority Data

Nov. 12, 2004 (JP) ................ 2004-329879

(51) Int. Cl.
*G06Q 30/00* (2006.01)
(52) U.S. Cl. .................... 705/26.1; 705/27.1
(58) Field of Classification Search ......... 705/26.1, 705/27.1
See application file for complete search history.

(56) References Cited

U.S. PATENT DOCUMENTS

| | | | |
|---|---|---|---|
| 6,021,202 A * | 2/2000 | Anderson et al. ............... 705/54 |
| 6,219,652 B1 * | 4/2001 | Carter et al. .................... 705/59 |
| 6,430,305 B1 * | 8/2002 | Decker ........................ 382/116 |
| 6,560,581 B1 * | 5/2003 | Fox et al. ........................ 705/51 |
| 7,035,817 B1 * | 4/2006 | Brothers ........................ 705/51 |
| 7,158,948 B1 * | 1/2007 | Rodriguez et al. ............. 705/28 |
| 7,603,313 B2 * | 10/2009 | Asano ............................ 705/40 |
| 7,644,281 B2 * | 1/2010 | Deguillaume et al. ........ 713/176 |
| 2002/0069174 A1 * | 6/2002 | Fox et al. ........................ 705/52 |
| 2002/0107814 A1 * | 8/2002 | Micali ............................ 705/67 |

(Continued)

FOREIGN PATENT DOCUMENTS

JP  11-328218 A  11/1999

(Continued)

OTHER PUBLICATIONS

Business Wire—Aug. 26, 1998, Verisign and Gemplus expand strategic relationship to develop joint smart-card for secure network application.*

(Continued)

*Primary Examiner* — Jason Dunham
(74) *Attorney, Agent, or Firm* — Sughrue Mion, PLLC

(57) ABSTRACT

The present invention provides a technique for establishing a new form of electronic commerce.

An electronic commerce system includes a search engine, a payment system and a user terminal. The search engine crawls documents published as web pages by users at a certain time and searches for and gathers sales information in the documents. The sales information gathered is listed and posted on a web page provided by the search engine, etc. Alternatively, items that match the search criteria are presented when a search is requested by a user who wishes to purchase an item. The search engine has a similar function to an electronic commerce site, which provides sales information from a seller to an intending purchaser on behalf of the seller.

8 Claims, 5 Drawing Sheets

U.S. PATENT DOCUMENTS

| | | | |
|---|---|---|---|
| 2002/0161723 A1 * | 10/2002 | Asokan et al. | 705/67 |
| 2004/0019564 A1 * | 1/2004 | Goldthwaite et al. | 705/44 |
| 2004/0230891 A1 * | 11/2004 | Pravetz et al. | 715/511 |
| 2005/0289078 A1 * | 12/2005 | Wary et al. | 705/64 |
| 2006/0074768 A1 * | 4/2006 | Horton | 705/26 |
| 2007/0061579 A1 * | 3/2007 | De Mello et al. | 713/176 |

FOREIGN PATENT DOCUMENTS

| | | |
|---|---|---|
| JP | 2002-149854 A | 5/2002 |
| JP | 2004-133552 A | 4/2004 |
| JP | 2004-164629 A | 6/2004 |
| JP | 2004-192481 A | 7/2004 |

OTHER PUBLICATIONS

Ken Horichi, "XML o Mochiita Denshi Catalog Seisei System (Mall of Malls)", NTT Gijutsu Journal, Japan, The Telecommunications Association, Oct. 1, 1998, vol. 10, No. 10, pp. 104-106.

* cited by examiner

[FIGURE 1]
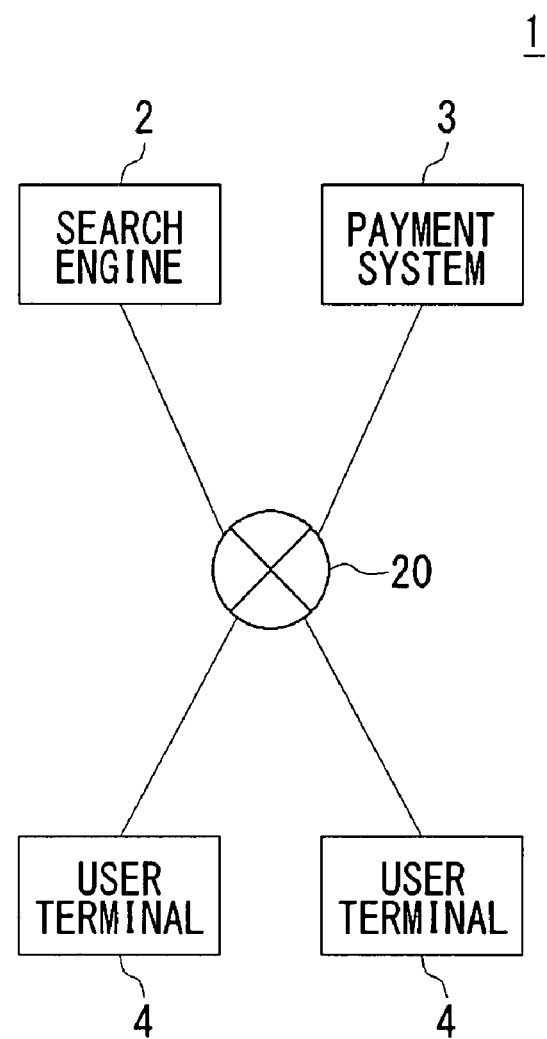

[FIGURE 2]
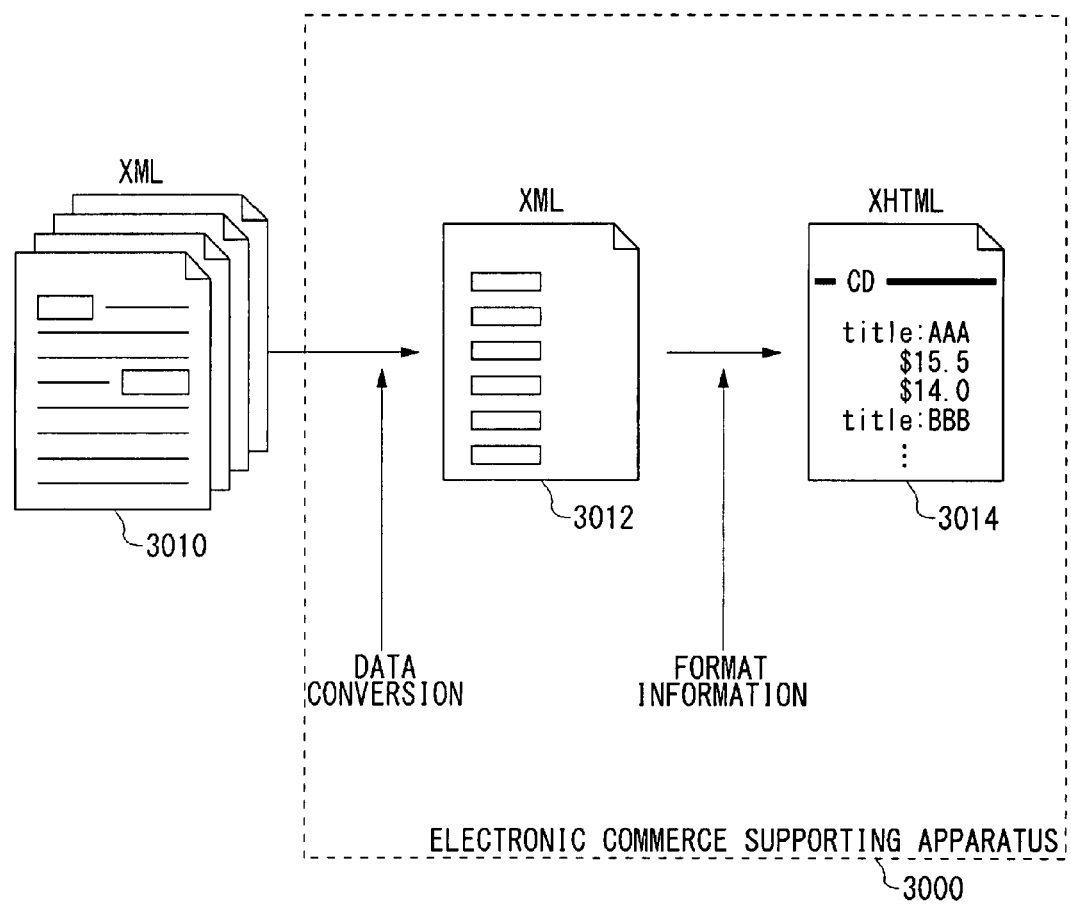

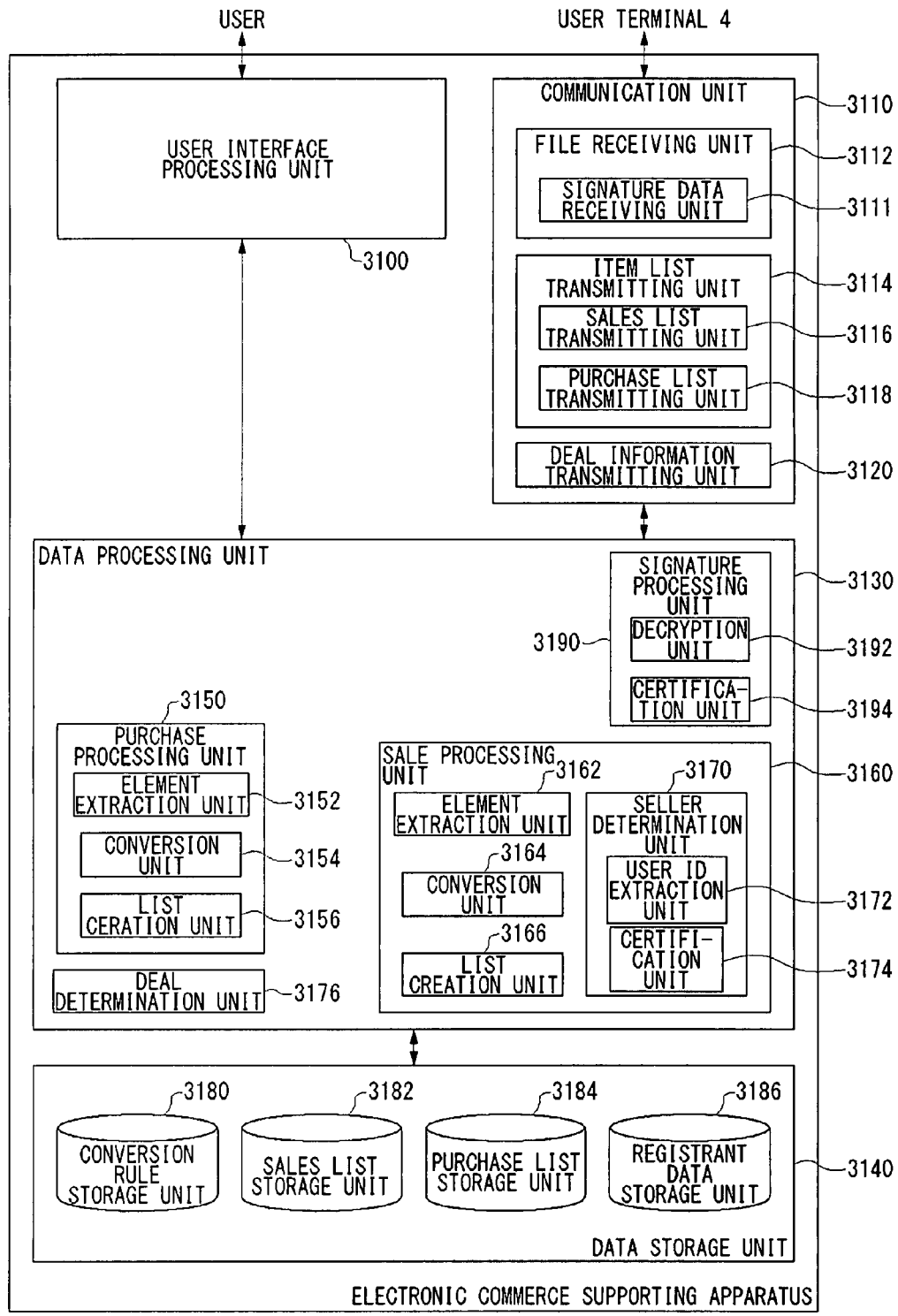
[FIGURE 3]

[FIGURE 4]
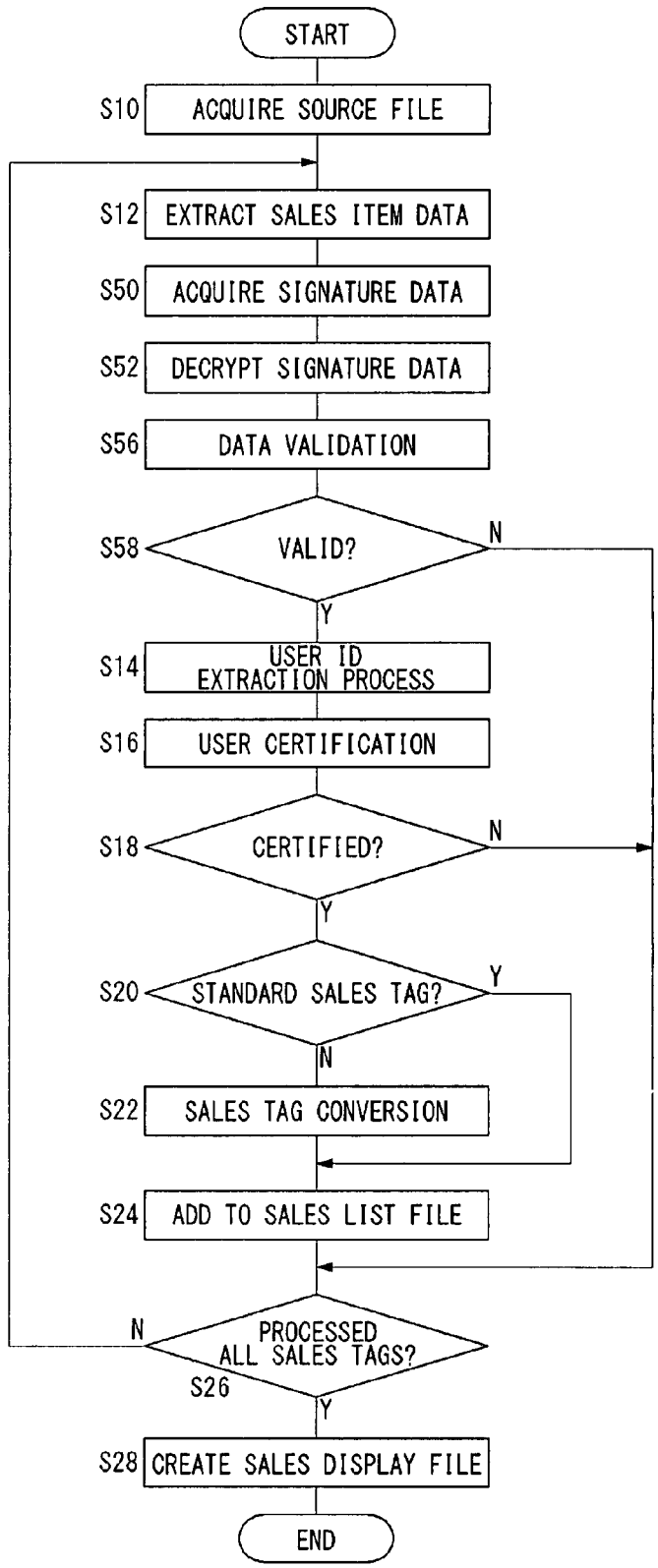

[FIGURE 5]
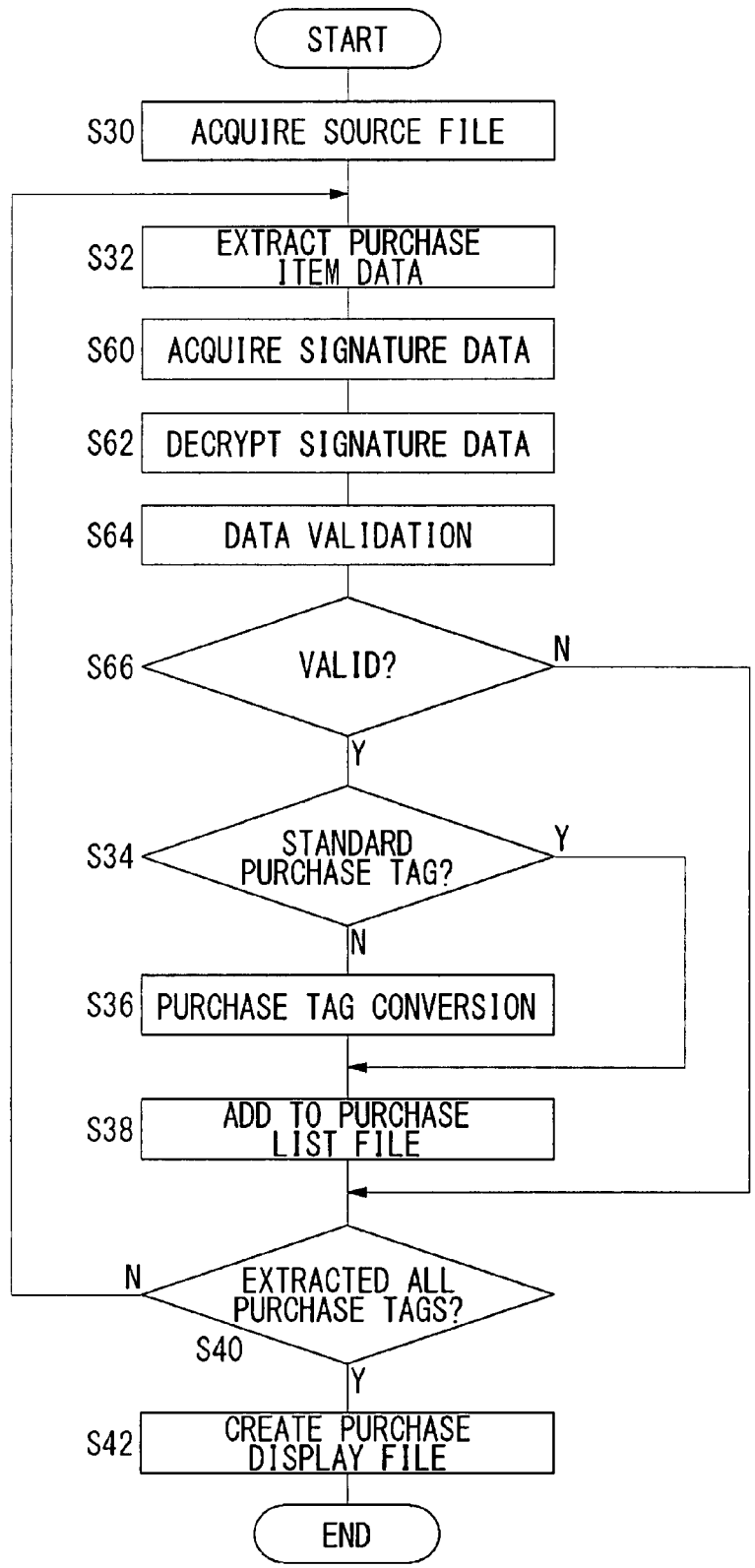

ELECTRONIC COMMERCE SYSTEM, ELECTRONIC COMMERCE SUPPORTING DEVICE, AND ELECTRONIC COMMERCE SUPPORTING METHOD

TECHNICAL FIELD

The present invention relates to an electronic commerce system.

BACKGROUND ART

Due to the widespread of personal computers and mobile phone terminals, an environment where everyone can use the Internet is being put in place. Web services via the Internet are also used widely. As an example, there is provided an auction site on which individuals are able to list their items for sale or win bids for items.

On conventional auction sites, sellers pay listing fees to the auction services to register their items for sale on the websites run by the auction services. Then, intending purchasers directly search the auction sites for desired items or seek items to purchase on affiliate sites introducing recommendable items, etc. If there are desired items, the intending purchasers will make bids.

DISCLOSURE OF INVENTION

Problem to be Solved by the Invention

The applicant considered developing a place for electronic commerce in which users can list their items for sale more easily and conceived of a technique for establishing a new business model.

The present invention has been made in view of such a situation, and a general purpose thereof is to provide a technique for providing a new place for electronic commerce.

Means for Solving the Problem

In one aspect of the present invention, there are comprised: a first apparatus for retaining a document published by a user; a search apparatus which is connected to the first apparatus via a network and searches the document for sales information; and means for presenting the sales information thus searched for.

Another aspect of the present invention is an electronic commerce supporting apparatus.

The apparatus is connected via a communications network to a first apparatus retaining a structured document file, which has a document structure for specifying the position at which sales item data is described in a document by attaching a sales annotator, formed as a certain character string, to sales item data including an intended sales item and the sales condition.

The apparatus comprises: a sales item element gathering unit for gathering a sales item element, which is a set of a sales annotator and sales item data, from a plurality of structured document files in the first apparatus using the sales annotator as a search key; a signature data receiving unit for receiving, from the first apparatus, signature data for validating a sales item element; a digital signature certification unit for determining the validity of the sales item element gathered, according to the signature data received from the first apparatus originating the element; a sales item list creation unit for listing a sales item element validated so as to create a sales item list file; and a sales item list transmitting unit for transmitting a sales item list file to an external apparatus.

The signature data may be data in which a value generated from sales item data according to a certain function is encrypted with secret key data of an intending seller. The digital signature certification unit may decrypt received signature data with public key data of an intending seller to extract a value and may validate the sales item element when the extracted value is equal to the value generated from the sales item data according to the certain function.

A certain function here is desirably a function for summarizing data for a parameter into data of a certain length so as to reduce the size of signature data, such as a hash function. The function is also desirably a function that generates different values when parameters differ, but it is acceptable in a practical sense as long as the function generates different values when data for parameters differ.

The signature data may be data in which address information of the first apparatus in a communications network is encrypted with secret key data of an intending seller. The digital signature certification unit may decrypt signature data with public key data of an intending seller to extract address information and may validate the sales item element when the extracted address information is equal to the address information of the first apparatus originating the signature data.

The address information may be any information that specifies address in a communications network, such as a URI (Uniform Resource Identifier). Also, address information may be applied to a hash function or the like to generate data of a certain length, so as to generate signature data by encrypting the generated value with a secret key.

The sales item list creation unit may create a sales item list file as a file with display layout information, by applying certain format information to the sales item list file having a document structure for specifying, using a sales annotator, the position at which sales item data is described.

The apparatus may further comprise a conversion rule retaining unit for retaining a conversion rule for converting sales annotators of a plurality of kinds to a certain sales annotator, wherein: the sales item element gathering unit may gather sales item elements using sales annotators of a plurality of kinds as search keys; and the sales item list creation unit may convert sales annotators of a plurality of kinds included in gathered sales item elements to a certain sales annotator and may create a sales item list file having a document structure for specifying, using the certain sales annotator, the position at which sales item data is described.

The sales item data may contain a user ID for identifying the intending seller of an item.

The apparatus may further comprise: an ID extraction unit for extracting a user ID from sales item data in a sales item element gathered; and a certification unit for referring to registrant data specifying a user ID of a user registered as a legitimate seller, so as to determine if the extracted user ID is a user ID of a registered user, wherein, the sales item list creation unit may create a sales item list file provided that the sales item element is given by a legitimate seller.

The apparatus may be connected via a communications network also to a second apparatus retaining a structured document file, which has a document structure for specifying the position at which purchase item data is described in a document by attaching a purchase annotator, formed as a certain character string, to purchase item data including an intended purchase item and the purchase condition.

The apparatus may further comprise: a purchase item element gathering unit for gathering a purchase item element, which is a set of a purchase annotator and purchase item data, from a plurality of structured document files in the second apparatus using the purchase annotator as a search key; a purchase item list creation unit for listing a purchase item element gathered so as to create a purchase item list file; and a purchase item list transmitting unit for transmitting a purchase item list file to an external device.

The signature data receiving unit may receive, from the second apparatus, signature data for validating a purchase item element. The digital signature certification unit may determine the validity of the purchase item element gathered, according to the signature data received from the second apparatus originating the element. The purchase item list creation unit may list a purchase item element validated so as to create a purchase item list file.

The purchase item list creation unit may create a purchase item list file as a file with display layout information, by applying certain format information to the purchase item list file having a document structure for specifying purchase item data using a purchase annotator.

The apparatus may further comprise: a deal determination unit for comparing a sales item list file with a purchase item list file to detect an intended sales item and an intended purchase item for which the sales condition matches the purchase condition; and a deal information transmitting unit which, when matching is detected between a sales condition and a purchase condition, transmits deal information indicating that a deal can be made, to the first apparatus originating the sales item element of the intended sales item and to the second apparatus originating the purchase item element of the intended purchase item.

Optional combinations of the aforementioned constituting elements, and implementations of the invention in the form of methods, apparatuses, systems may also be practiced as additional modes of the present invention.

Advantages

The present invention provides a technique for providing a new place for electronic commerce.

BRIEF DESCRIPTION OF THE DRAWINGS

FIG. 1 is a diagram which shows a configuration of a trading system according to an embodiment.

FIG. 2 is a schematic diagram for describing the process of creating an item display file.

FIG. 3 is a functional block diagram of an electronic commerce supporting apparatus.

FIG. 4 is a flowchart which shows a process of creating a sales display file from a source file.

FIG. 5 is a flowchart which shows a process of creating a purchase display file from a source file.

EXPLANATION OF REFERENCE NUMERALS

1 electronic commerce system
2 search engine
3 payment system
4 user terminal
3000 electronic commerce supporting apparatus
3010 source file
3012 list file
3014 display file
3100 user interface processing unit
3110 communication unit
3112 file receiving unit
3114 item list transmitting unit
3116 sales list transmitting unit
3118 purchase list transmitting unit
3120 deal information transmitting unit
3130 data processing unit
3140 data storage unit
3150 purchase processing unit
3152 element extraction unit
3154 conversion unit
3156 list creation unit
3160 sale processing unit
3162 element extraction unit
3164 conversion unit
3166 list creation unit
3170 seller determination unit
3172 user ID extraction unit
3174 certification unit
3176 deal determination unit
3180 conversion rule storage unit
3182 sales list storage unit
3184 purchase list storage unit
3186 registrant data storage unit

BEST MODE FOR CARRYING OUT THE INVENTION

The embodiment proposes a technique for establishing a new business model in which individual users can freely participate in net business. Specifically, the embodiment proposes a technique for establishing a new electronic commerce site in which sellers can list and sell their items on the sellers' own web pages or the likes, without the bother of registering the items on an auction site.

FIG. 1 shows a configuration of an electronic commerce system 1 according to the embodiment. The electronic commerce system 1 comprises a search engine 2, a payment system 3 and a user terminal 4. These components are connected via the Internet 20. The electronic commerce system 1 may further comprise a server for providing an electronic commerce site, but in this embodiment the search engine has a function equivalent to such site, as will be discussed later.

The search engine 2 searches for sales information in a document published as a web page by a user. In the present embodiment, when a user describes sales information in a document, an annotation therefor is attached to the document so as to improve the efficiency, speed, and accuracy of search conducted by the search engine 2. The search engine 2 searches for the annotation in the document accordingly. A user may use a user terminal 4 to edit a document and add an annotation to the sales information therein. Also, when a user publishes a web page using a blog service or the like, the blog site may provide a UI for adding to the document an annotation for specifying sales information. In this case, users' convenience can be improved while the operator of the blog site can expect to gain more users by providing attractive services with added value.

The search engine 2, for example, crawls user's web pages in a blog site or the like at predetermined time intervals to gather sales information. The gathered sales information may be listed and posted on a web page provided by the search engine 2. Alternatively, items that match the search criteria may be presented when a search is requested by a user who wishes to purchase an item. Thus, the search engine 2 has a similar function to an electronic commerce site, which provides sales information from a seller to an intending purchaser on behalf of the seller. Since the search engine 2 gathers and publishes sales information, users need not to pay fees to register their items on an auction site or the like, and hence, users' convenience can be improved.

If an intending purchaser finds an desired item, deal negotiation will be conducted with the seller of the item. The deal negotiation may be conducted in any style, such as an auction or direct price negotiation. If the deal negotiations are completed successfully, the purchaser will access the payment system 3 to make payment. The payment system 3 may be run by the operator of the search engine 2. Alternatively, a payment system provided by another service may be used therefor.

There may be provided an affiliate site to introduce sales information published on web pages of other users. A user who introduces items on an affiliate site views web pages of other users and introduces recommendable items on the site. If deal negotiations are completed successfully between a seller and an intending purchaser who has accessed the seller's web page via the affiliate site, a fee may be paid to the introducer by the seller.

In this way, such technique as stated above enables a business model, in which sellers do not list their items in marketplaces on the Internet, like flea markets, but instead open their shops within their own web pages, like garage sales.

Additional description will now be given in association with the embodiment.

In the following, there will be described an electronic commerce supporting apparatus 3000, which has a function of the search engine 2 shown in FIG. 1 and supports trades between intending sellers and intending purchasers of items.

FIG. 2 is a schematic diagram for describing the process of creating an item display file.

The electronic commerce supporting apparatus 3000 is an apparatus for supporting the distribution of items by gathering sales item data in association with items intended for sale and purchase item data in association with items intended for purchase, which have been published electronically on the Internet 20, to publish those data electronically and collectively.

Source files 3010 in FIG. 2 are various XML files published electronically on the Internet 20. The source file contains sales item data or purchase item data. In the source file 3010, sales item data is specified by a certain tag called sales tag, in terms of the position or format in which the data is described. The sales tag is a tag given a certain element name that is defined in a certain namespace, such as <user-commerce:sell>. The sales item data is a set of data including the name of an intended sales item, a user ID for specifying an intending seller, a suggested sales price, and the production year, model number, type or image of an intended sales item, etc. Each of the data may be provided as a content of a tag or an attribute of a tag. Also, the sales tag may have hierarchical tags defined so as to have a child element. Similarly, purchase item data is specified by a certain tag called purchase tag in the source file 3010, in terms of the position or format in which the data is described. The purchase tag may also be a tag given a certain element name that is defined in a certain namespace, e.g., <user-commerce:buy>. The purchase item data is a set of data including the name of an intended purchase item, a suggested purchase price, etc. Both the sales tag and purchase tag may be contained together in a single source file 3010.

In order to validate such sales item data or purchase item data, the source file 3010 has a digital signature attached thereto. The digital signature scheme employs a public key cryptosystem to validate data. For instance, an intending seller of an item computes a hash value of sales item data according to a certain hash function and encrypts the value with a secret key, so as to generate signature data. The signature data is disclosed in the source file 3010 to be made available to the outside. As for the hash function, SHA-1 or another known function may be used.

The electronic commerce supporting apparatus 3000 acquires the signature data and sales item data from the source file 3010 and decrypts the signature data with the public key of the intending seller to retrieve the hash value. If the hash value computed from the sales item data acquired is equal to the hash value retrieved from the signature data, the sales item data acquired will be considered valid. If the hash values do not agree, the sales item data acquired will be considered invalid because the sales item data acquired might have been tampered with by a person other than the intending seller, or because the signature data may be a false data that has not been encrypted with the right secret key of the intending seller.

All or a part of the sales item data may be specified as parameters of the hash function. For example, the user ID, the name of the intending seller, and the name of the intended sales item may be specified as the parameters. The signature data may be generated by encrypting with the secret key the URI (Uniform Resource Identifier) to which the source file 3010 is posted electronically. If the URI to which the source file 3010 is electronically posted is not identical with the URI acquired from the signature data, the electronic commerce supporting apparatus 3000 will determine that the sales item data acquired from the source file 3010 is invalid. With such signature identification, a source file 3010 copied and posted without permission on a website other than the intended site can be excluded from the files subject to trading. Also, as a matter of course, the validity of the whereabouts of sales item data may be determined based on a hash value computed with a URI given as a parameter. The present embodiment will be described assuming that signature data is generated by encrypting a hash value, which is computed using data representing the name of an intended sales item and the suggested sales price among sales item data.

Besides sales item data, purchase item data is also subject to digital signature. In the present embodiment, it will be assumed that signature data is generated by encrypting a hash value, which is computed using data representing the name of an intended purchase item and the suggested purchase price among purchase item data. Thus, signature data is generated for each of intended sales items and intended purchase items.

An example of a process will be described next in which the electronic commerce supporting apparatus 3000 gathers sales item data from among various source files 3010 and posts the data electronically.

The electronic commerce supporting apparatus 3000 crawls the Internet 20 to sequentially acquire source files 3010 published electronically thereon and extracts sales item data from the source files 3010 using a sales tag as a search key. The apparatus then newly creates a sales list file as a list file 3012, in which the sales item data is displayed in a list according to the sales tag. The sales list file is also an XML file in which sales item data is listed using a sales tag. The sales list file only lists sales item data that has been validated according to signature data. XSLT (eXtensible Stylesheet Language Transformations) or another known means may be employed for data conversion process in creating the list file 3012 from the sales item data extracted from the source file 3010.

The electronic commerce supporting apparatus 3000 provides the sales tag in the sales list file with format information for display so as to create a sales display file as a display file 3014. The sales display file is an XHTML file for displaying sales item data in a list. The format information here may be provided using known means, such as CSS (Cascading StyleSheets) or XSLFO (XSL Formatting Objects). The sales display file is posted electronically on the Internet 20 by the electronic commerce supporting apparatus 3000. With the sales display file, a user can collectively view a list of validated items intended for sale.

The same process is applied to purchase item data. The electronic commerce supporting apparatus 3000 extracts purchase item data from source files 3010 using a purchase tag as a search key. The apparatus then creates a purchase list file as a list file 3012, in which the purchase item data is displayed in a list. The purchase list file is an XML file in which purchase item data is listed using a purchase tag. The purchase list file, also, only lists purchase item data that has been validated according to signature data. The electronic commerce supporting apparatus 3000 provides the purchase tag in the purchase list file with format information for display so as to create a purchase display file as a display file 3014, and the apparatus posts the file electronically. With the purchase display file, a user can collectively view a list of items intended for purchase.

Stated above is the outline of a process in which a display file 3014, containing collective data of intended sales items or intended purchase items, is created from source files 3010. Hereinbelow, the overall process will be described more specifically.

FIG. 3 is a functional block diagram of the electronic commerce supporting apparatus 3000.

Each block shown therein can be implemented by an element such as a CPU of a computer or by a mechanism in terms of hardware, and by a computer program or the like in terms of software. FIG. 3 illustrates functional blocks implemented by the cooperation of those components. Therefore, it will be obvious to those skilled in the art that the functional blocks may be implemented in a variety of forms by a combination of hardware and software.

Here will be mainly described a function to be performed by each block, and the specific operation will be described in association with FIGS. 4 and 5.

The electronic commerce supporting apparatus 3000 comprises a user interface processing unit 3100, a communication unit 3110, a data processing unit 3130 and a data storage unit 3140.

The user interface processing unit 3100 handles overall processing regarding user interface, such as processing inputs from users or displaying information for users. The communication unit 3110 handles communication process with each of the user terminals 4 via the Internet 20.

The present embodiment will be described assuming that the user interface processing unit 3100 provides a user interface service for the electronic commerce supporting apparatus 3000. In another example, a user may operate the electronic commerce supporting apparatus 3000 via the Internet 20. In such case, the communication unit 3110 receives information on an operation instruction from a user terminal 4 and transmits, to the user terminal, information on the result of processing performed on the basis of the operation instruction.

The data processing unit 3130 performs various kinds of data processing based on input operation via the user interface processing unit 3100 or data acquired from the communication unit 3110. The data processing unit 3130 also functions as an interface among the user interface processing unit 3100, the communication unit 3110 and the data storage unit 3140.

The data storage unit 3140 stores various data including each setting data provided in advance or data received from the data processing unit 3130.

The communication unit 3110 comprises a file receiving unit 3112, an item list transmitting unit 3114 and a deal information transmitting unit 3120.

The file receiving unit 3112 acquires a source file 3010 from an external device, such as a user terminal 4. A signature data receiving unit 3111 in the file receiving unit 3112 acquires, from the external device publishing the source file 3010, signature data for sales item data or purchase item data. The item list transmitting unit 3114 posts a display file 3014 electronically. The item list transmitting unit 3114 includes a sales list transmitting unit 3116, which posts a sales display list file electronically, and a purchase list transmitting unit 3118, which posts a purchase display list file electronically. The item list transmitting unit 3114 may transmit the display file 3014 so that an external web server can publish the display file 3014 electronically. The deal information transmitting unit 3120 transmits deal information to a user terminal 4 by e-mail. The deal information indicates that the sales conditions match the purchase conditions on an item, and hence, a trade can be made. In such situation, i.e. when a trade is possible, the deal information is transmitted to the parties involved in the trade.

The data processing unit 3130 comprises a signature processing unit 3190, a purchase processing unit 3150, a sale processing unit 3160 and a deal determination unit 3176.

The signature processing unit 3190 handles certification process regarding digital signature. The signature processing unit 3190 includes a decryption unit 3192 and a certification unit 3194. The decryption unit 3192 decrypts signature data, acquired by the signature data receiving unit 3111, with a public key. The certification unit 3194 determines if the decrypted data is valid.

The purchase processing unit 3150 handles processing associated with purchase item data. The purchase processing unit 3150 includes an element extraction unit 3152, a conversion unit 3154 and a list creation unit 3156. The element extraction unit 3152 extracts purchase item data from source files 3010 using a purchase tag as a search key. The purchase tags may be standardized tags such as <user-commerce:buy>, as previously mentioned, or may be of multiple kinds. For example, the names of elements of the purchase tags may differ in English-writing countries and Chinese-writing countries. Also, the purchase tag may be modified in structure so as to include a new tag as a child element. The conversion unit 3154 converts such purchase tags of various forms to a standard-type purchase tag (hereinafter referred to as "standard purchase tag"). The list creation unit 3156 then creates a purchase list file based on the standard purchase tag. Accordingly, even if source files 3010 contain various kinds of purchase tags, the resulting purchase list file only contains the standard purchase tag. A definition file which defines conversion rules is stored in a conversion rule storage unit 3180. The list creation unit 3156 provides the standard purchase tag in the purchase list file with format information so as to create a purchase display file in XHTML form. The purchase list file and the purchase display file thus created are stored in a purchase list storage unit 3184.

The sale processing unit 3160 includes an element extraction unit 3162, a conversion unit 3164, a list creation unit 3166 and a seller determination unit 3170.

The element extraction unit 3162 extracts sales item data from source files 3010 using a sales tag as a search key. The sales tags also may be of multiple kinds. The conversion unit 3164 converts various forms of sales tags to a standard-type sales tag (hereinafter referred to as "standard sales tag"). The list creation unit 3166 then creates a sales list file based on the standard sales tag. Accordingly, even if source files 3010 contain various kinds of sales tags, the resulting sales list file only contains the standard sales tag. The list creation unit 3166 provides the standard sales tag in the sales list file with format information so as to create a sales display file in XHTML form. The sales list file and the sales display file thus created are retained in a sales list storage unit 3182.

The seller determination unit 3170 refers to a user ID contained in sales item data so as to determine if the intending seller is a legitimate user. A registrant data storage unit 3186 stores registrant information, a list of user IDs of legitimate users, in advance. A user ID extraction unit 3172 extracts a user ID from sales item data. The user ID may be set as an attribute of a sales tag. A certification unit 3174 certifies an intending seller according to whether the extracted user ID appears in the registrant information. The user ID may be encrypted before being transmitted or received.

The deal determination unit 3176 refers to a sales list file and a purchase list file so as to detect matching between the sales conditions included in the sales item data and the purchase conditions included in the purchase item data. When, for example, the name of the intended sales item matches the name of the intended purchase item, and in addition, the suggested sales price matches the suggested purchase price, it is determined that a deal can be made. The deal information transmitting unit 3120 transmits deal information indicating that a deal can be made, to the intending seller and the intending purchaser of the item concerned. The deal information is transmitted in the form of an e-mail. The deal information includes the sales item data or purchase item data of the item concerned in the trade. In another example, a trackback may be used to notify the source file 3010 published by the intending seller that a trade can be made. In other words, the electronic commerce supporting apparatus 3000 may transmit the deal information in the form of a trackback ping.

Thus, the electronic commerce supporting apparatus 3000 not only publishes sales display files or purchase display files on the Internet 20 but promotes trading of items more actively.

FIG. 4 is a flowchart which shows a process of creating a sales display file from a source file.

First, the file receiving unit 3112 crawls the Internet 20 to acquire a source file 3010 (S10). The element extraction unit 3162 in the sale processing unit 3160 then extracts sales item data from the source file 3010 (S12). The signature data receiving unit 3111 acquires signature data attached to the sales item data (S50). The decryption unit 3192 then decrypts the signature data with the public key provided by the originator of the signature data, i.e. intending seller, to retrieve the hash value (S52). The certification unit 3194 computes a hash value based on the sales item data extracted in S12 and compares the value with the hash value retrieved from the signature data so as to examine the validity of the sales item data (S56). If the data is invalid (S58-N), the process will be skipped to S26. If the data is valid (S58-Y), the user ID extraction unit 3172 will extract the user ID from the sales item data (S14). The certification unit 3174 performs certification process to determine if the extracted user ID is registered (S16). If the user ID is certified (S18-Y), the conversion unit 3164 will then determine if the extracted sales tag is a standard sales tag (S20). If the tag is not the standard sales tag (S20-N), the conversion unit 3164 will convert the extracted sales tag to the standard sales tag (S22). If the extracted sales tag is the standard sales tag (S20-Y), the process of S22 will be skipped. Accordingly, a sales list file is created based on the standard sales tag (S24). If the user ID is not certified in S18 (S18-N), the process of S20 through S24 will be skipped.

If all the sales tags in the source file 3010 have not been processed (S26-N), the process will return to S12 to process the next sales item data. If all the sales tags have been processed (S26-Y), the list creation unit 3166 will create a sales display file from the sales list file (S28). The process stated above is performed on various source files 3010, and the data in the files will be collectively organized in a sales list file or a sales display file accordingly. The sales list transmitting unit 3116 posts the sales display file electronically on the Internet 20. Users can view the sales display file and select items that they wish to purchase from among the intended sales items therein. When a purchase request is submitted, the deal determination unit 3176 determines that the conditions for the deal have been met, and the deal information transmitting unit 3120 transmits deal information to the intending seller of the item concerned. Other than posting a sales display file electronically, the sales list transmitting unit 3116 may transmit to a user terminal 4 a definition file for handling a sales list file and a standard sales tag, in response to a request from the user terminal 4.

FIG. 5 is a flowchart which shows a process of creating a purchase display file from a source file.

First, the file receiving unit 3112 acquires a source file 3010 (S30). The element extraction unit 3152 in the purchase processing unit 3150 then extracts purchase item data from the source file 3010 (S32). The signature data receiving unit 3111 acquires signature data attached to the purchase item data (S60). The decryption unit 3192 then decrypts the signature data with the public key provided by the originator of the signature data, i.e. intending purchaser, to retrieve the hash value (S62). The certification unit 3194 computes a hash value based on the purchase item data extracted in S32 so as to examine the validity of the purchase item data (S64). If the data is invalid (S66-N), the process will be skipped to S40. If the data is valid (S66-Y), the conversion unit 3154 will then determine if the extracted purchase tag is a standard purchase tag (S34). If the tag is not the standard purchase tag (S34-N), the conversion unit 3154 will convert the extracted purchase tag to the standard purchase tag (S36). If the tag is the standard purchase tag (S34-Y), the process of S36 will be skipped. Accordingly, a purchase list file is created based on the standard purchase tag (S38).

If all the purchase tags in the source file 3010 have not been processed (S40-N), the process will return to S32 to process the next purchase item data. If all the purchase tags have been processed (S40-Y), the list creation unit 3156 will create a purchase display file from the purchase list file (S42). The process stated above is performed on various source files 3010, and the data in the files will be collectively organized in a purchase list file or a purchase display file accordingly. The purchase display file is posted electronically on the Internet 20. Users can view the purchase display file and select items that they wish to sell from among the intended purchase items therein. Also at such time, the deal determination unit 3176 determines that the conditions for the deal have been met, and the deal information transmitting unit 3120 transmits deal information to the intending purchaser of the item concerned. The purchase list transmitting unit 3118 may transmit to a user terminal 4 a definition file for handling a purchase list file and a standard purchase tag, in response to a request from the user terminal 4.

Thus, the electronic commerce supporting apparatus 3000 stated in the embodiment enables item data specified by a sales tag or a purchase tag to be automatically gathered and posted electronically. Users can collectively view the data of items intended for distribution around the world on a display file 3014 and can select items that they wish to trade from among those items. Therefore, trades can be expected with higher probability than in a case where intending sellers or purchasers are invited on a low-traffic website of an individual. Also, users can readily participate in a trade merely by creating a source file 3010 using a certain tag. In addition, the safety of trades can be ensured by managing users with user IDs and signature data.

When a trade is agreed upon, the parties involved may directly make the deal via the payment system 3. Alternatively, the operator of the electronic commerce supporting apparatus 3000 or the payment system 3 may mediate the trade between those users. Also, items may not be necessarily tangible goods. For example, when self-made software or other electronic data is traded, the electronic commerce supporting apparatus 3000 or the payment system 3 may mediate the trade itself.

The deal determination unit 3176 may determine that a deal can be made on an item when the sales conditions match the purchase conditions. The unit may also determine whether the deal can be made according to how close the sales condition and the purchase condition are. For example, if an intending purchaser wishes to purchase an item A for 38 dollars when the suggested sales price of the item is 40 dollars, there may be room for negotiation in the price between the intending seller and the intending purchaser. Then, the deal information transmitting unit 3120 may transmit deal information to the intending seller and the intending purchaser of the item A provided that the difference between the suggested purchase price and the suggested sales price is a certain amount or less. The deal information includes the sales item data and the purchase item data of the item A. The intending seller and the intending purchaser may negotiate directly with each other based on the deal information. Alternatively, the electronic commerce supporting apparatus 3000 may develop a private electronic bulletin board on which the parties can negotiate with each other so as to support the negotiation. According to such aspect, the distribution of items is further promoted, and users' convenience is expected to be improved.

The electronic commerce supporting apparatus 3000 may function as an auction system. For example, it is assumed that there is an item B on which a deal at the suggested sales price of more than 50 dollars is desired within a certain term, as specified in its sales conditions. Then, intending purchasers, who wish to trade on such sales conditions, may enter their purchase conditions on the electronic commerce supporting apparatus 3000 via the Internet 20. Subsequently, the electronic commerce supporting apparatus 3000 may transmit deal information to the intending seller and an intending purchaser who has presented the most favorable conditions among the offered purchase conditions that meet the sales conditions.

The auction system may operate autonomously. For instance, the deal determination unit 3176 may refer to the purchase list file updated within a set period from time to time and search for a purchase condition better than the sales condition specified on an item. Subsequently, the unit may transmit deal information to an intending purchaser who has presented the most favorable condition among the offered purchase conditions.

The present invention has been described with reference to the embodiment. The embodiment is intended to be illustrative only and it will be obvious to those skilled in the art that various modifications to constituting elements or processes could be developed and that such modifications are also within the scope of the present invention.

The sales annotator or the purchase annotator described in the claims is implemented as a tag in the present embodiment. Besides a tag, an attribute value or an XPath expression for indicating item data in another file may also function as such annotator.

It will also be obvious to those skilled in the art that the function to be achieved by each constituent feature described in the claims may be implemented by each of the functional blocks described in the present embodiment or by the cooperation of those functional blocks.

Although the embodiment above describes an example of processing XML documents, the electronic commerce supporting apparatus 3000 in the embodiment is also capable of processing documents described in other markup languages, such as SGML and HTML.

INDUSTRIAL APPLICABILITY

The present invention provides a technique for providing a new place for electronic commerce.

The invention claimed is:

1. An electronic commerce supporting apparatus connected via a communications network to a first apparatus retaining a structured document file, which has a document structure for specifying the position at which sales item data is described in a document by attaching a sales annotator, formed as a certain character string, to sales item data including an intended sales item and the sales condition, the electronic commerce supporting apparatus comprising:

a sales item element gathering unit for gathering a sales item element, which is a set of a sales annotator and sales item data, from a plurality of structured document files in the first apparatus using the sales annotator as a search key;

a signature data receiving unit for receiving, from the first apparatus, signature data for validating a sales item element;

a digital signature certification unit for determining the validity of the sales item element gathered, according to the signature data received from the first apparatus originating the element;

a sales item list creation unit for listing a sales item element validated so as to create a sales item list file; and a sales item list transmitting unit for transmitting a sales item list file to an external apparatus, and connected via a communications network also to a second apparatus retaining a structured document file, which has a document structure for specifying the position at which purchase item data is described in a document by attaching a purchase annotator, formed as a certain character string, to purchase item data including an intended purchase item and the purchase condition, the electronic commerce supporting apparatus further comprising:

a purchase item element gathering unit for gathering a purchase item element, which is a set of a purchase annotator and purchase item data, from a plurality of structured document files in the second apparatus using the purchase annotator as a search key;

a purchase item list creation unit for listing a purchase item element gathered so as to create a purchase item list file; and a purchase item list transmitting unit for transmitting a purchase item list file to an external apparatus, wherein:

the signature data receiving unit receives, from the second apparatus, signature data for validating a purchase item element;

the digital signature certification unit determines the validity of the purchase item element gathered, according to the signature data received from the second apparatus originating the element; and the purchase item list creation unit lists a purchase item element validated so as to create a purchase item list file.

2. The electronic commerce supporting apparatus of claim 1, wherein:

the signature data is data in which a value generated from sales item data according to a certain function is encrypted with secret key data of an intending seller; and the digital signature certification unit decrypts received signature data with public key data of an intending seller to extract a value and validates the sales item element when the extracted value is equal to the value generated from the sales item data according to the certain function.

3. The electronic commerce supporting apparatus of claim 1, wherein:

the signature data is data in which address information of the first apparatus in a communications network is encrypted with secret key data of an intending seller; and the digital signature certification unit decrypts signature data with public key data of an intending seller to extract address information and validates the sales item element when the extracted address information is equal to the address information of the first apparatus originating the signature data.

4. The electronic commerce supporting apparatus of claim 1, wherein the sales item list creation unit creates a sales item list file as a file with display layout information, by applying certain format information to the sales item list file having a document structure for specifying, using a sales annotator, the position at which sales item data is described.

5. The electronic commerce supporting apparatus of claim 1, further comprising a conversion rule retaining unit for retaining a conversion rule for converting sales annotators of a plurality of kinds to a certain sales annotator, wherein:

the sales item element gathering unit gathers sales item elements using sales annotators of a plurality of kinds as search keys; and the sales item list creation unit converts sales annotators of a plurality of kinds included in gathered sales item elements to the certain sales annotator and creates a sales item list file having a document structure for specifying, using the certain sales annotator, the position at which sales item data is described.

6. The electronic commerce supporting apparatus of claim 1, wherein the sales item data contains a user ID for identifying the intending seller of an item, the electronic commerce supporting apparatus further comprising:

an ID extraction unit for extracting a user ID from sales item data in a sales item element gathered; and a certification unit for referring to registrant data specifying a user ID of a user registered as a legitimate seller, so as to determine if the extracted user ID is a user ID of a registered user, wherein, the sales item list creation unit creates a sales item list file provided that the sales item element is given by a legitimate seller.

7. The electronic commerce supporting apparatus of claim 1, wherein the purchase item list creation unit creates a purchase item list file as a file with display layout information, by applying certain format information to the purchase item list file having a document structure for specifying purchase item data using a purchase annotator.

8. The electronic commerce supporting apparatus of claim 1, further comprising:

a deal determination unit for comparing a sales item list file with a purchase item list file to detect an intended sales item and an intended purchase item for which the sales condition matches the purchase condition; and a deal information transmitting unit which, when matching is detected between a sales condition and a purchase condition, transmits deal information indicating that a deal can be made, to the first apparatus originating the sales item element of the intended sales item and to the second apparatus originating the purchase item element of the intended purchase item.

* * * * *